Nov. 25, 1958   M. F. FISH   2,861,606
REMOTE CONTROL SET WORKS
Filed Jan. 2, 1957   7 Sheets-Sheet 1
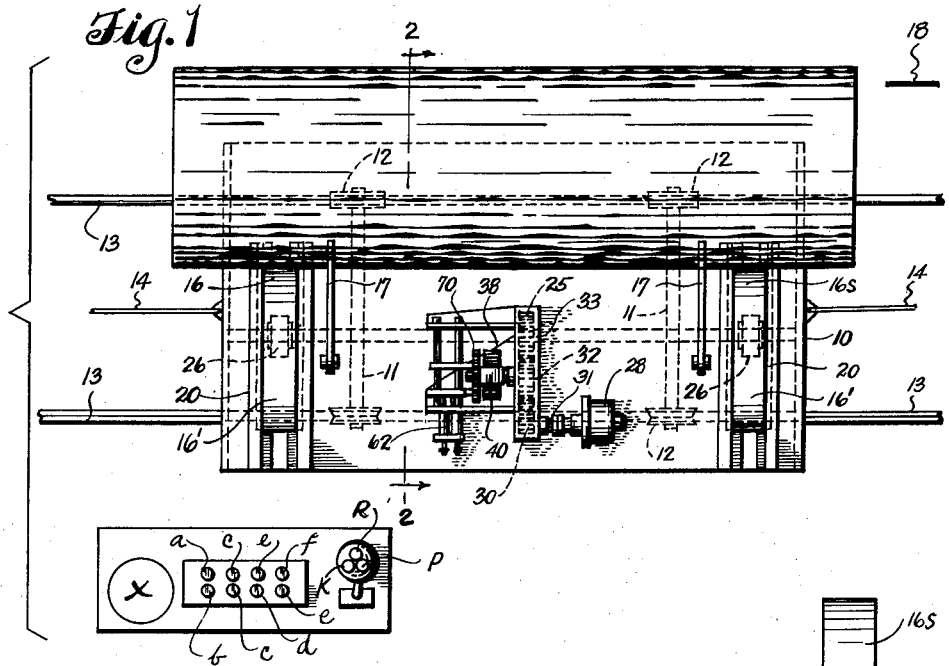
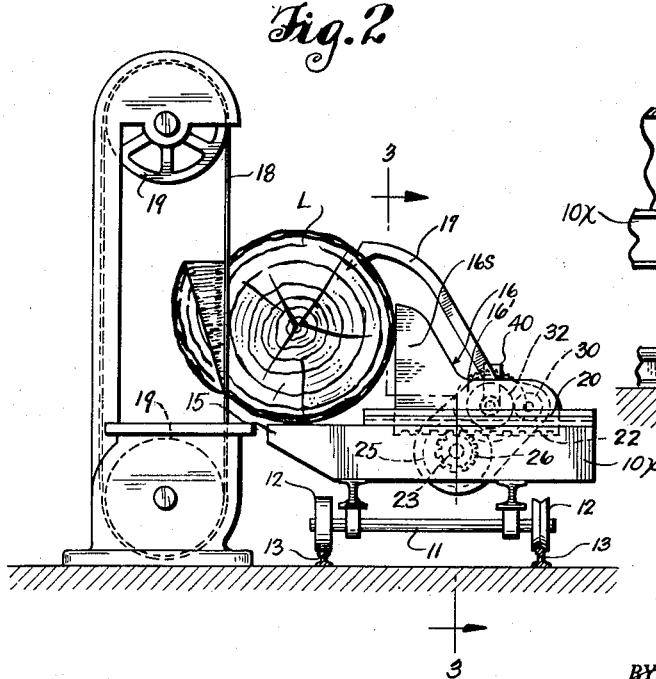
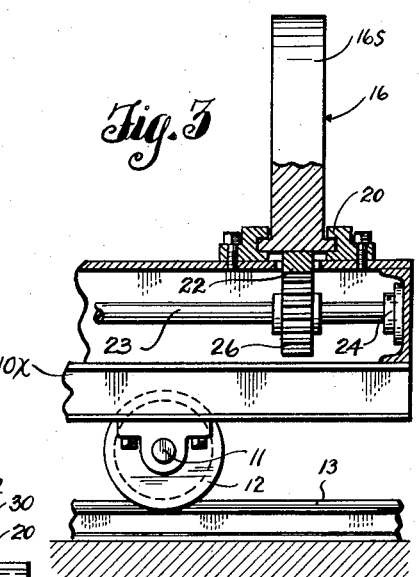
INVENTOR.
MARION F. FISH
BY
Robinson + Berry
ATTORNEYS

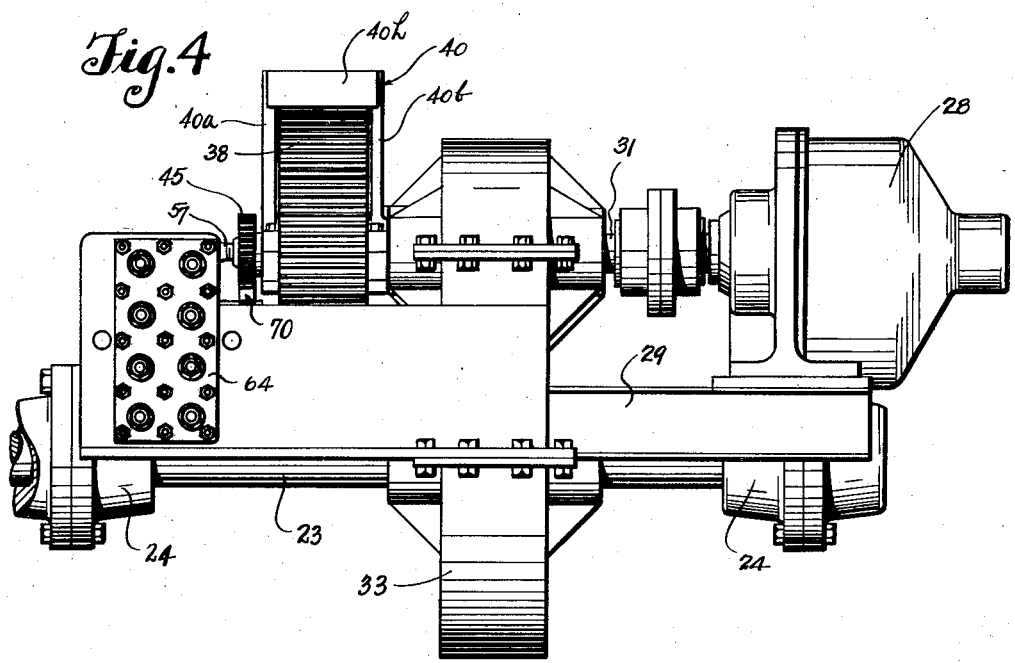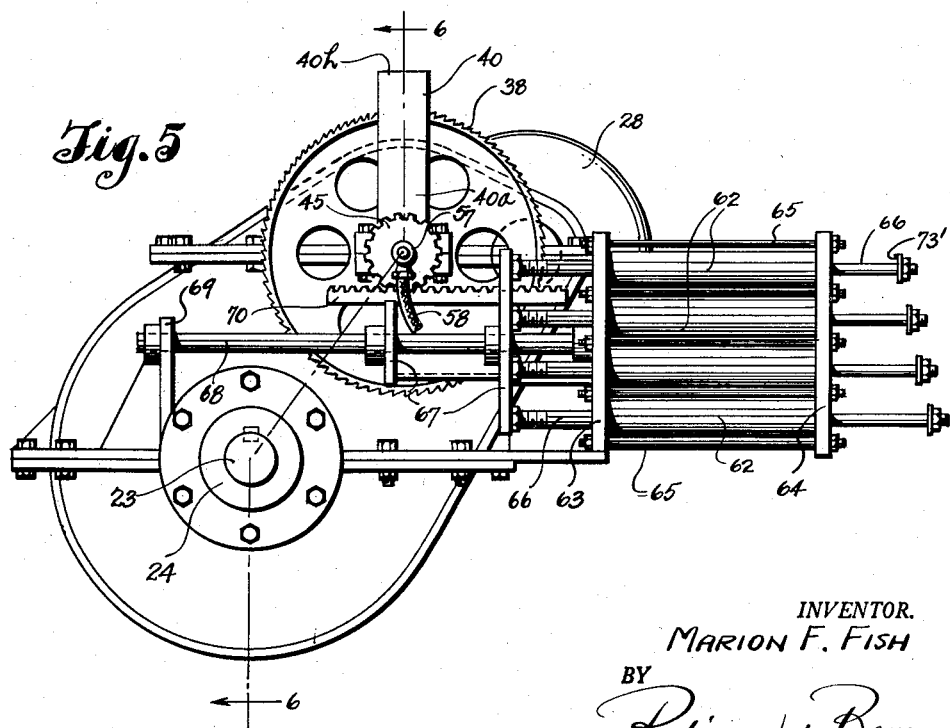

Nov. 25, 1958  M. F. FISH  2,861,606
REMOTE CONTROL SET WORKS
Filed Jan. 2, 1957  7 Sheets-Sheet 3
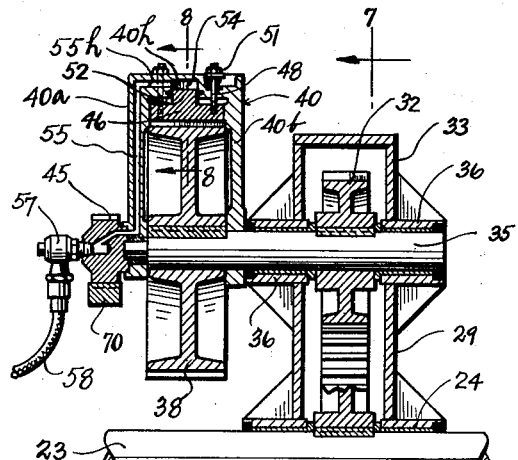
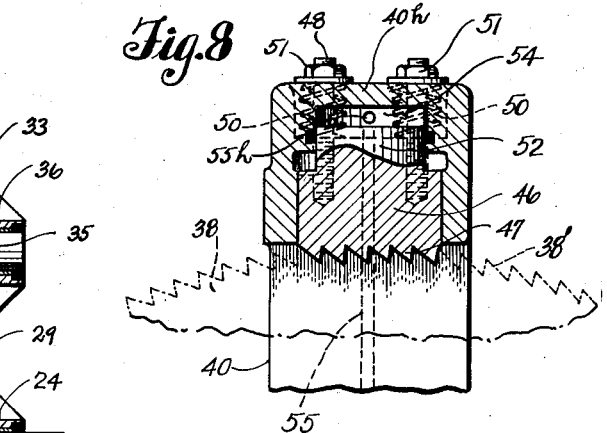
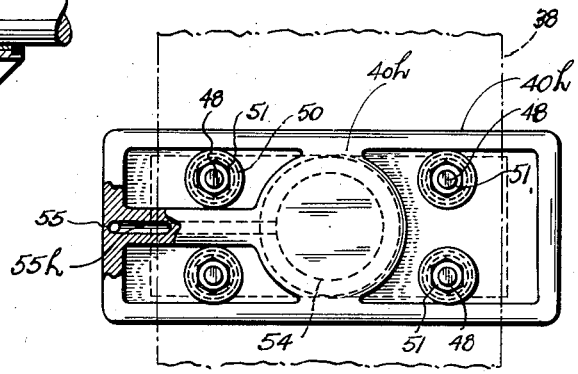
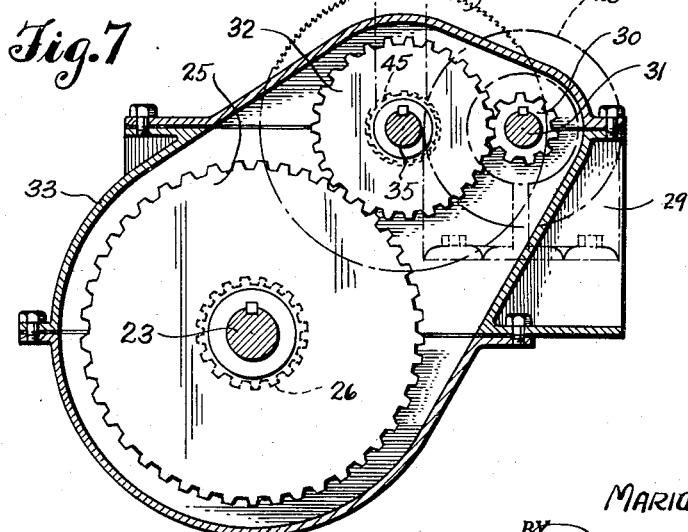
INVENTOR.
MARION F. FISH
BY
Robinson & Berry
ATTORNEYS Nov. 25, 1958  M. F. FISH  2,861,606
REMOTE CONTROL SET WORKS
Filed Jan. 2, 1957  7 Sheets-Sheet 4
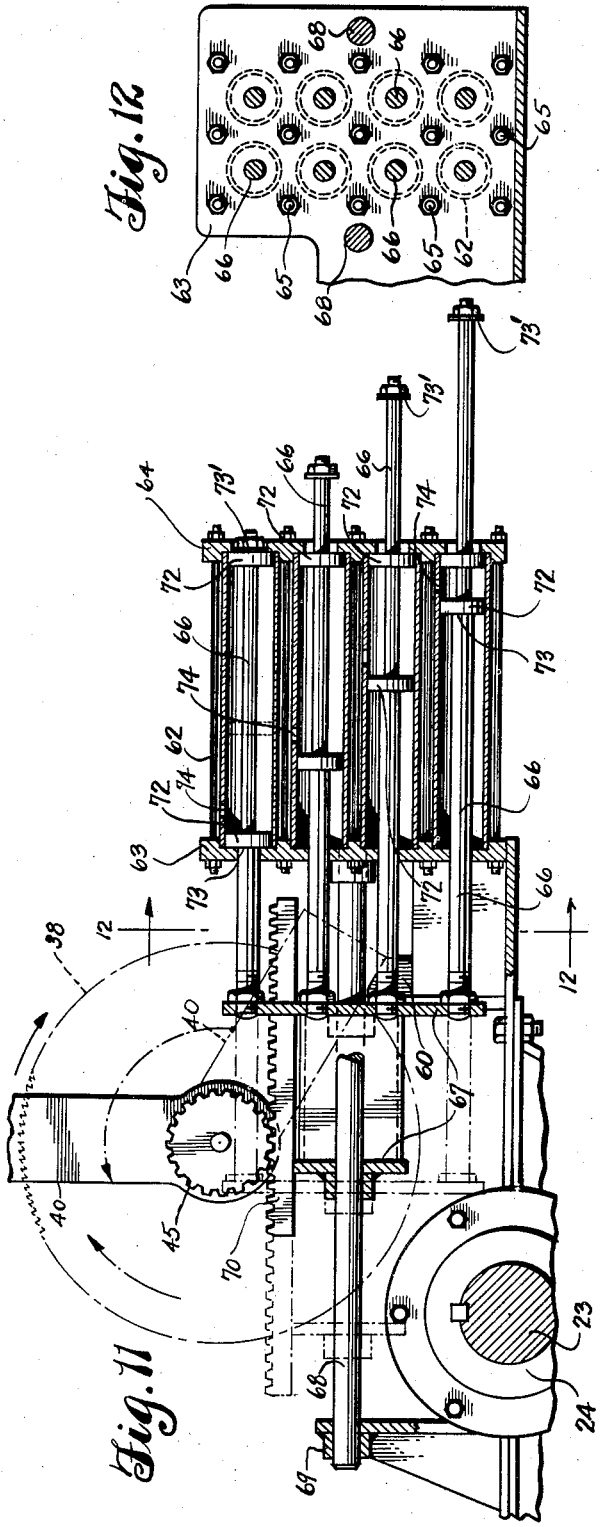
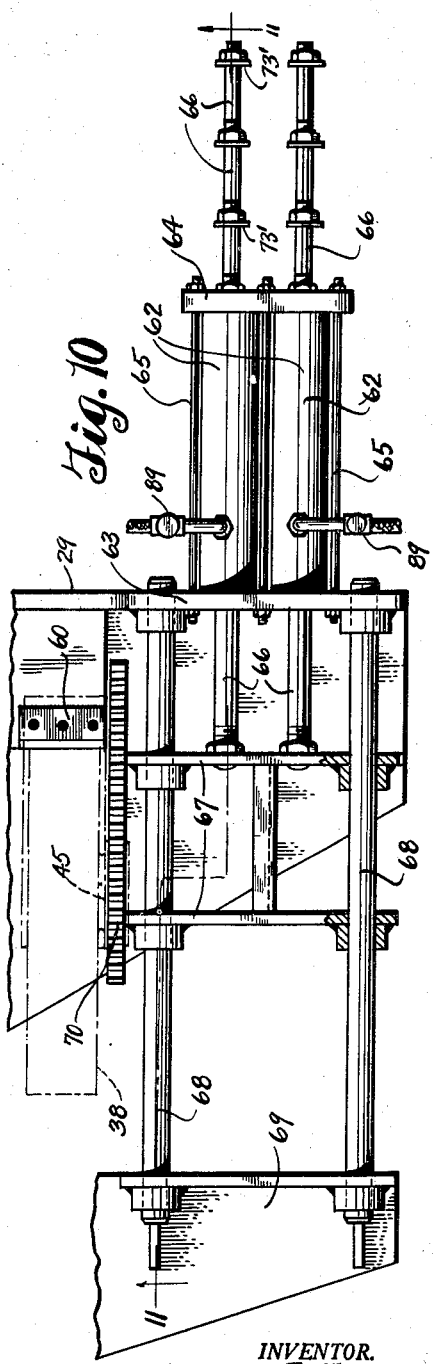
INVENTOR.
MARION F. FISH
BY
Rotiman + Berry
ATTORNEYS Nov. 25, 1958 M. F. FISH 2,861,606
REMOTE CONTROL SET WORKS
Filed Jan. 2, 1957 7 Sheets-Sheet 5

INVENTOR.
MARION F. FISH
BY
Robinson & Berry
ATTORNEYS

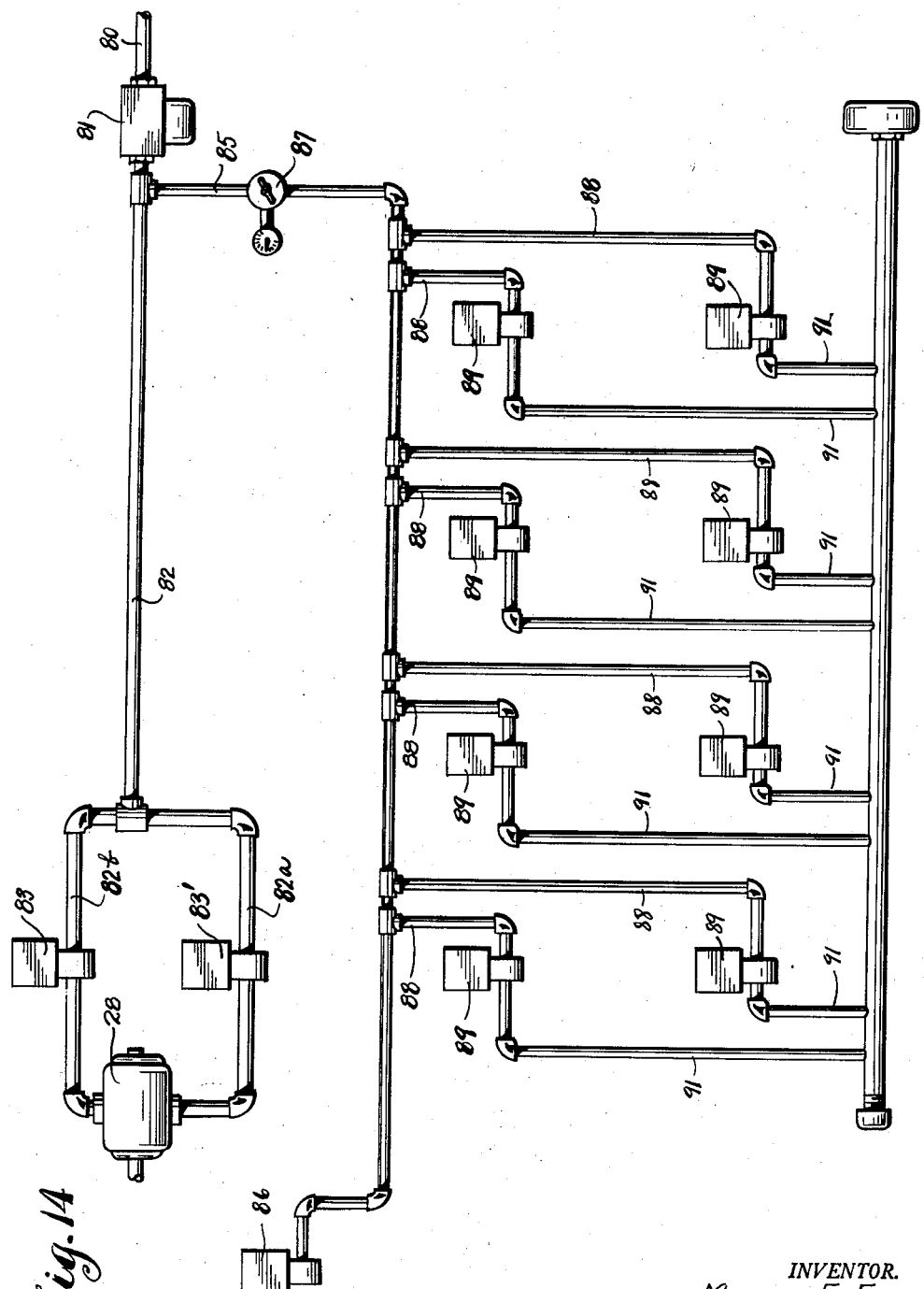

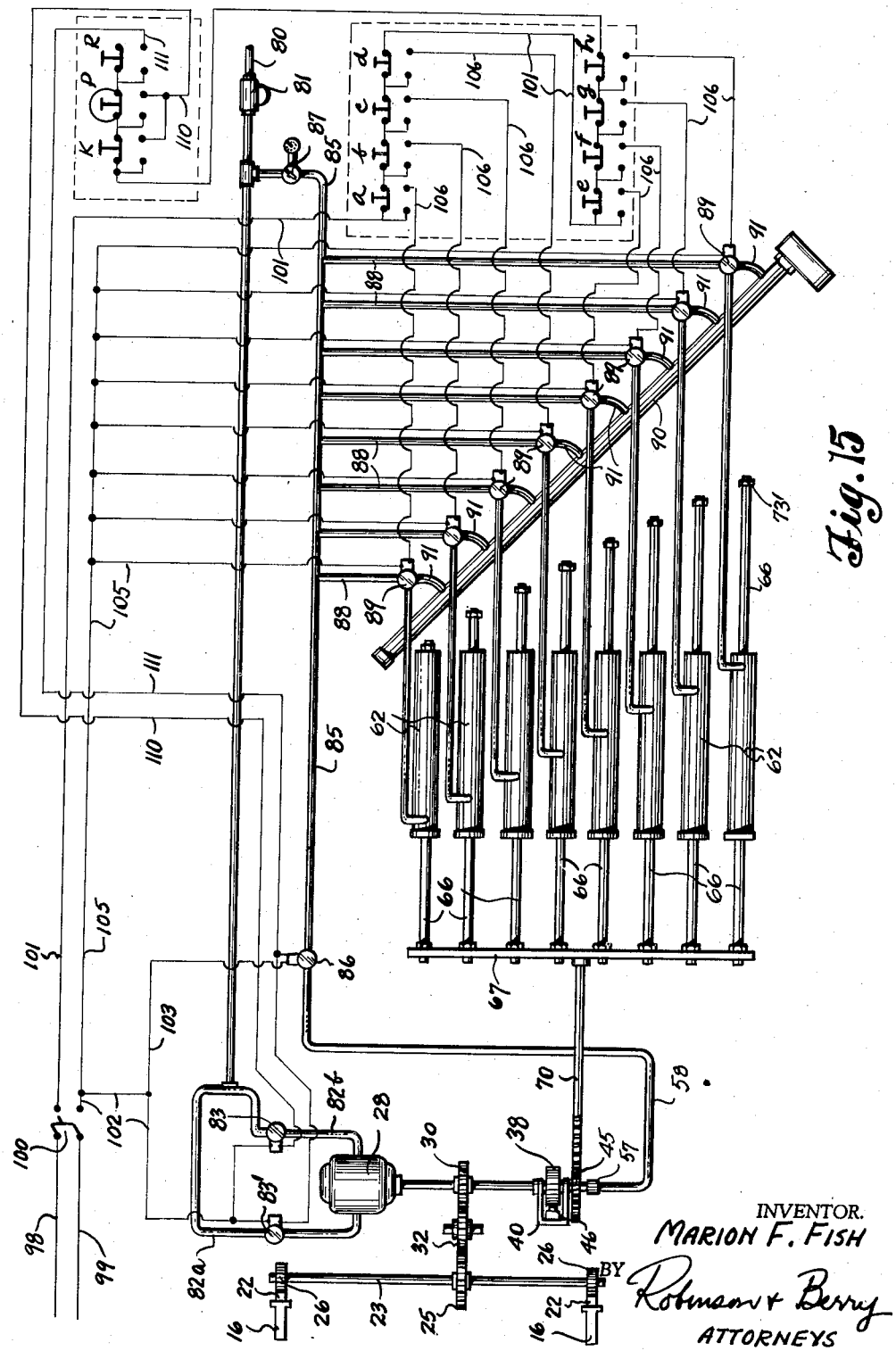

United States Patent Office 2,861,606
Patented Nov. 25, 1958

2,861,606

REMOTE CONTROL SET WORKS

Marion F. Fish, Everett, Wash., assignor to Sumner Iron Works, Inc., Everett, Wash.

Application January 2, 1957, Serial No. 632,085

16 Claims. (Cl. 143—120)

This invention relates to sawmill setworks, and has reference more particularly to a novel setworks mechanism and remote control therefor; it being the principal object of the invention to provide a "no man" setworks, operable under push button control by the sawyer from either a near or remote location as may be required, for a quick, and accurate mechanical adjustment of the log carriage knees to effect the setting out of a log or cant to any one of a plurality of predetermined distances.

More specifically stated, the objects and advantages of the present invention reside in the provision of a setworks employing a plurality of air cylinders which are selectively operable, under push-button control, each to position the setting arm of the setworks in an accurate position for the next required movement of the carriage knees.

Yet another object of the invention resides in the provision of a setworks as above stated, wherein the driving of the set shaft through which knee adjustment is made, is through a gear train which includes a gear wheel keyed to a shaft on which a ratchet wheel also is fixed, and a sweep arm, carrying a ratchet engaging pawl is swingingly movable; and wherein the various air cylinders, whereby the distance of set is established, are selectively operable to locate the sweep arm at different but definite distances from a fixed stop, and means is operable to cause locking engagement of the pawl with the ratchet wheel after the sweep arm has been positioned, with the result that the set shaft in performing its function, will be limited in turning to the extent permitted by the travel of the sweep arm before it engages said stop.

It is also an object of the present invention to provide means for the automatic disengaging of the pawl from the ratchet wheel incident to the push button operation that energizes a cylinder to establish a setting distance of the sweep arm, and then reestablishes it in locking contact with the ratchet wheel.

Further objects and advantages of the invention reside in the details of construction and combination of parts embodied therein and in their mode of operation, as will hereinafter be fully described.

In accomplishing the above mentioned and other objects of the invention, I have provided the improved details of construction, the preferred forms of which are illustrated in the accompanying drawings, wherein:

Fig. 1 is a diagrammatic plan view of a log carriage as used in a saw mill, and as equipped with a setworks embodied by the present invention.

Fig. 2 is a cross-sectional view of the log carriage taken on line 2—2 in Fig. 1, showing one of the carriage knees and its rack and pinion adjusting connection with the set shaft.

Fig. 3 is a sectional detail of the carriage, taken on line 3—3 of Fig. 2.

Fig. 4 is a side elevation of the present setworks, shown separate from the carriage.

Fig. 5 is an end view of the same, showing the sweep arm and ratchet wheel, and means for setting the sweep arm at various starting positions.

Fig. 6 is a section taken on line 6—6 in Fig. 5, showing the sweep arm and ratchet wheel mounting shaft.

Fig. 7 is a section taken on line 7—7 in Fig. 6, showing the gear train through which the set shaft is driven.

Fig. 8 is an enlarged sectional detail, taken on line 8—8 in Fig. 6, showing the toothed pawl and its mounting in the head of the sweep arm.

Fig. 9 is an outer face view of the sweep arm, and a showing of the air channel leading to the cylinder in the head of the sweep arm.

Fig. 10 is a top view of the bank of air cylinders and their operating connection with the sweep arm.

Fig. 11 is a vertical section through some of the air cylinders, and showing their operating connections with the sweep arm for effecting its selective positioning; the section being taken on line 11—11 in Fig. 10.

Fig. 12 is a vertical section taken on line 12—12 in Fig. 11.

Fig. 14 is a schematic layout of the pneumatic system which operates under control of the electrical system.

Fig. 15 is a schematic showing of the combined mechanical, pneumatic and electrical equipment of the present invention.

Figure 13:
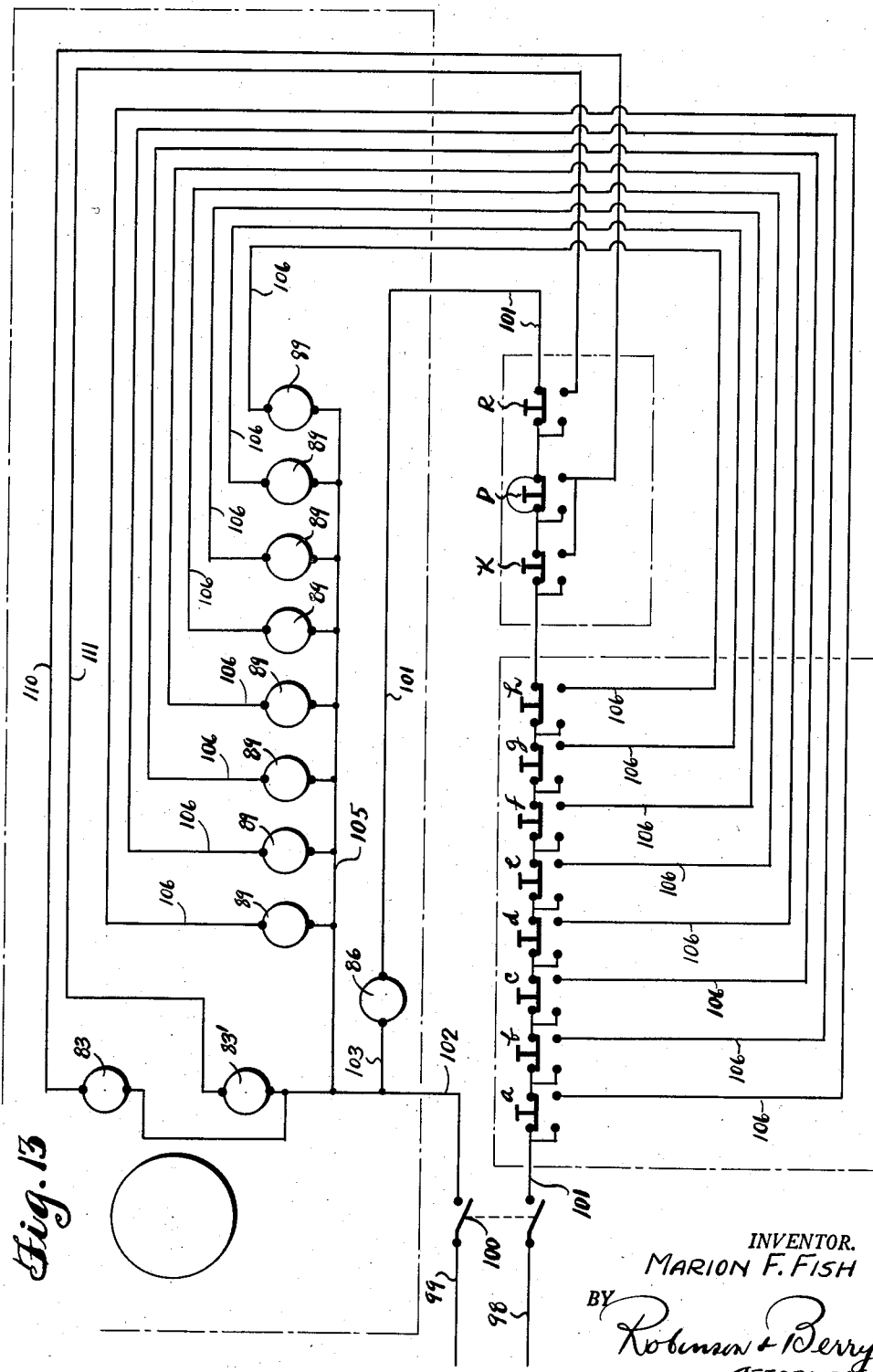
Fig. 13 is a schematic layout of the electrical system for controlling the setworks.

The present invention relates to setworks as designed for use in lumber mills which are equipped for the sawing of logs or cants into slabs or boards and for cutting these pieces into lumber of standardized dimensions. For this lumber sawing operation, the piece to be cut, which will hereinafter be referred to as a log, is mounted longitudinally on a carriage, and the carriage is mounted for guided reciprocal travel on a track for the advancing of the supported log endwise against a saw to effect the cutting of a slab therefrom. The log carriage is equipped with two or more knees against which the inside edge of the log is held, by suitable means. Ordinarily the setworks is under control of a man who rides on the carriage, but in the present instance no man is required since the operation is placed under control of the sawyer. After the cutting of each board from the log, the knees are outwardly adjusted, thus to set the log out a designated distance and thus establish the thickness of the next board to be cut therefrom. This outsetting movement of the knees, and also their retraction is effected and controlled through the set works mechanism embodied by the invention.

The knees of the carriage are adapted to be adjusted outwardly or retracted in unison by the turning of a set shaft. In the present invention, a counter shaft is geared to the set shaft to rotate therewith. This counter shaft has a ratchet wheel keyed thereon and it also carries a sweep arm adjacent the ratchet wheel, that is adapted to be swung about the axis of the counter shaft to any one of a plurality of distances away from a fixed stop and then, while at the selected distance, to be locked to the ratchet wheel to turn therewith, thus providing that, incident to the energization of the set shaft for setting out the knees, the set shaft can turn only the distance permitted by the sweep arm before it engages the stop. The selective setting of the sweep arm at any one of the various arcuate distances provided for is effected by the selective energization of a corresponding air cylinder. In the present instance, I employ eight of such air cylinders, but there might be more or less.

The present invention resides primarily in the combination with the set shaft, of the ratchet wheel, sweep arm, the arm locking pawl, the bank of air cylinders and means whereby they are individually and selectively operable to adjust the sweep arm to a predetermined setting, and the means for causing it to be locked to the ratchet wheel thus to limit the "setting distance" to be effected upon energization of the set shaft.

Referring more in detail to the drawings:

The showing of parts in Figs. 1 and 2, with which the present setworks is employed, is typical of saw mill carriages. In these views, the log carriage is designated in its entirety by numeral 10. In Fig. 2 it is shown to comprise a horizontal frame structure or bed 10x supported on cross axles 11 which are equipped at their ends with wheels 12 which are mounted for guided travel on track rails 13—13. The carriage also is equipped with suitable means for moving it reciprocally along the trackway. In the present showing, in Fig. 1, this means is indicated merely by the ends of cables 14—14 attached to opposite ends of the carriage. The carriage is equipped with the usual head blocks 15 for support of the log, and with knees 16 against which a log is positioned and held for the operation, by any suitable means, such as the dogs 17.

In placing a log on the carriage for cutting, it is so placed that its outside longitudinal edge projects beyond a longitudinal edge of the carriage to such extent that when the carriage is caused to travel, for example, to the right from its position in Fig. 1, the log will be moved endwise against a saw 18 which operates to cut a section therefrom.

Then, after each board cutting operation, the carriage knees are set out a definite distance, thus to establish the thickness of the next board to be removed by the passing of the log against the saw.

The kind or type of saw employed in this operation is immaterial to this invention. However, in Fig. 2, I have shown it as being a vertical band saw 18 operable about wheels 19—19. It is also shown in Figs. 2 and 3, that the carriage knees 16, which may be two or more in number, but here shown as two only for simplification of the drawings, are mounted for advancement and retraction in guideways 20 that extend transversely of the carriage. Each knee has a vertical leg 16s and a horizontal leg 16'; the latter being equipped on its underside with a longitudinal rack 22. Extended longitudinally of the carriage frame beneath all knees, is the set shaft 23; this being rotatably mounted to move with the carriage, in bearings 24, and equipped between its ends with a driving gear wheel 25 as seen in Fig. 6. Also fixed on the set shaft 23, as in Figs. 2 and 3, are pinion gears 26, corresponding to the knees and operatively in mesh with the knee shifting racks 22.

Rotation of the set shaft 23 in opposite directions is effected by means of a reversible air motor 28 through a reduction gear train, shown in Fig. 7, which terminates at one end with the gear 25. It is shown in Fig. 4 that the motor 28 is mounted by a frame structure 29 that is fixed on the carriage and it is seen in Fig. 7 that a small pinion gear 30 is fixed on the drive shaft 31 of the motor. This pinion gear operates in driving mesh with a somewhat larger gear wheel 32 which, in turn, meshes with the set shaft driving gear 25. The gear train, comprising the gears 30, 32 and 25, is enclosed in a gear case 33 fixed to the carriage. Extending through this gear case is a counter shaft 35 on which the gear 32 is keyed, as shown best in Fig. 6. The shaft 35 is parallel with the set shaft 23 and is revolvable in bearings 36—36 formed in the gear case. One end of shaft 35 extends from the gear case, as observed in Fig. 6, and at its outer end has a ratchet wheel 38 keyed thereon. This gear turns in accordance with turning of the set shaft 23.

Mounted for axial rotation on the shaft 35 is a sweep arm 40. This arm comprises spaced opposite side members, 40a and 40b, extended radially of and closely along opposite faces of the ratchet gear 38, and joined at their outer ends by a cross-head 40h; this head being slightly spaced from the toothed, peripheral surface of the ratchet wheel. Fixed rigidly to the outside member 40a of this sweep arm, in coaxial alignment with the shaft 35, is a small pinion gear 45, and it is through the mediacy of this gear, as presently explained, that the sweep arm is positioned preparatory to a knee adjusting operation.

Fitted for movement in the head 40h of the sweep arm, in a direction longitudinally of the arm 40, is a pawl 46 (Figs. 6 and 8) made in the form of a rectangular block, and toothed across its under surface, as at 47, for interlocking mesh with the teeth 38' of the ratchet wheel. This pawl block is equipped with four outwardly directed mounting studs 48 slidable through holes in head 40h to permit the pawl to be engaged with and disengaged from the ratchet wheel teeth. Coiled springs 50 are applied about the outer end portions of the studs and retained under compression between the head and retaining nuts 51 threaded onto the outer ends of the studs.

Formed centrally of the pawl 46, and extending outwardly therefrom as shown in Fig. 8 is a piston 52 that is reciprocally fitted in a cylindrical chamber 54 formed in the head 40h of the sweep arm. This chamber is closed at its outer end, and is equipped to receive air under pressure at its closed end, through an air channel 55. This channel enters axially of the gear 45, as shown in Fig. 6, then it is directed into the side member 40a of the sweep arm 40 and leads within the same to its outer end where it opens into the chamber 54. An air hose swivel 57 is applied to the gear 45, and to this an air supply conduit 58 is connected. When air under pressure is applied to the cylindrical chamber 54, the pawl is forced inwardly into interlocked connection with the ratchet wheel, as seen in Fig. 8, thus to lock the sweep arm to the ratchet wheel. When air pressure is released from the chamber the pawl is disengaged from the ratchet by the pressure of springs 50.

Located adjacent the ratchet wheel in the path of travel of the sweep arm 40 when it is locked to the ratchet, is a stop block 60. This block is shown best in Figs. 10 and 11, and it preferably is fixed to the base frame 29.

When the sweep arm is stopped, it assumes the downwardly inclined position shown in dash lines in Fig. 11. It is swung counterclockwise from this position for a setting and the greater the arc from the stopping position, the greater will be the setting distance.

Assuming that the sweep arm 40 has been adjusted to a selected setting away from the stop 60, and locked to the ratchet wheel by the pawl, and that the set shaft and ratchet wheel are then caused to be rotated by the motor 28 in a knee setting operation, the sweep arm will swing with the turning of its mounting shaft 35, until it is stopped by contact with the stop 60. This positively stops shaft 23 and limits the outsetting travel of the knees. Thus, it will be understood that the starting position of the sweep arm determines the extent of its arc of travel before it engages the stop 60 and the degree of the arc determines the distance to which the knees will be outset for each operation by the set shaft.

The present invention resides, in part, in the provision of selective means for setting the sweep arm in any one of a plurality of starting positions; each to provide for an arc of travel of the arm differing from that of any other. The positioning means comprises a bank of air cylinders 62, here shown to be eight in number, but more or less may be employed. All cylinders are fixedly mounted in close, parallel relationship in a frame that is rigidly fixed to the gear case 29 as seen in Fig. 5. All cylinders are horizontally disposed, of equal size, and disposed axially perpendicular to the vertical plane of the set shaft 23. It is shown in Figs. 5, 10 and 11, that the cylinder mounting frame comprises the opposite head plates 63—64 between which the cylinders are clamped by tie rods 65. Each cylinder, as best shown in Fig. 10, contains a piston rod 66. All rods extend freely through the head plate 63 and all are fixed to a cross-head 67. The cross-head is reciprocally movable on guide rods 68—68 fixed at their opposite ends in the plate 63 and support 69 on the gear case as observed in Fig. 10.

Also fixed to the cross-head 67 to move therewith, is a rack bar 70 which is supported in operative mesh with the sweep arm positioning gear 45 as noted in Figs. 5 and 11. Thus, it will be understood that with the sweep arm engaged against the stop 60, as in Fig. 11, and the pawl disengaged from the ratchet wheel, an adjusting movement of the cross-head 67 causes the sweep-arm to be swung counter clockwise about its supporting shaft accordingly and away from the stop 60 to a starting position.

Each air cylinder mechanism is designed to effect the setting of the sweep arm at a definite starting position differing in arcuate extent from those possible by the other cylinders. To accomplish the functional actuation of the piston rods as applied to their respective cylinders, each piston rod is formed with a portion thereof of reduced diameter on which two independent pistons 72—72 are slidably fitted for movement. The part of reduced diameter of each piston rod is defined by abutment shoulders 73—73' at its opposite ends, and these shoulders face each other and are spaced a distance exactly equal to the inside length of the cylinders. The lengths of the eight piston rods, as measured from the shoulders 73 to the cross head 67 to which each is fixed, are different as will be understood by reference to the showing of the four piston rods in Fig. 11. Each cylinder is provided with an air inlet port 74 through which air under pressure can be admitted to the cylinder between pistons and may also be exhausted therefrom. Each cylinder is equipped with a solenoid valve as presently explained for controlling the admittance and exhaustion of operating air. When air under pressure is admitted to any cylinder, the pistons are forced apart, thus to push them to a position against the opposite ends of the containing cylinder. In doing this, the piston rod of the energized cylinder is caused to be moved to a definite position where it will be held against endwise movement. With this movement of the piston rod, the cross head 67 will be shifted accordingly and as it moves it operates through the rack bar 70 and gear 45 to swing the sweep arm 40 from its stopped position against the stop 60 to a predetermined starting position, such for example, a position corresponding to the upright position in which it is shown in Fig. 5.

It is further to be understood that since the length of any piston rod as measured between the cross head 67 and rod shoulder 73 is different from the others, it is possible, by selective energization of the cylinders, to position the sweep arm for the adjusting of the knees at various setting positions.

After the sweep arm 40 has been selectively positioned by the functional movement of the piston rod of an energized cylinder, the pawl 46, as carried by the outer end of the arm, is caused to be locked with the ratchet. Then with the subsequent turning of the set shaft 23 and the shaft 35 and ratchet wheel, the sweep arm will be caused to move therewith and finally to engage the stop 60 and definitely stop the set shaft and thus limit the distance to which the knees set the log out.

For the actuation of the various cylinders, a system of air pressure conduits, valves and electrical controls is provided, as shown in Figs. 13 and 14. In Fig. 14, 80 designates a supply line for air under pressure. This connects through a pressure regulator 81 with a pipe line 82 connected through line 82a and 82b to the opposite sides of the reversible air driven motor 28. Interposed in the two lines, 82a and 82b, respectively, are three-way normally closed solenoid valves 83 and 83'. When the air is supplied to the motor through valve 83, the drive is in one direction. When supplied through the valve 83', the drive is reversed, that is, in the other direction.

Leading off from the air line 82 is a pipe line 85 extended to the pawl control valve 86. Pressure in this line is established by a regulator 87 interposed in the line. Also leading off from the pipe line 85, to individually supply the various air cylinders, 62, are pipe lines 88, each connecting to the air port 74 of its corresponding cylinder through a 3-way, normally closed solenoid valve 89 through which air can be admitted to the cylinder from the supply when the valve is opened, and exhausted when the valve is set in a closed position. It is indicated in Fig. 14 that the exhaust sides of the valves 89 are connected to an exhaust line 90 by pipe connections 91.

For the control of the various valves, 83, 83', 86 and 89 for the application and control of operating air, reference is directed to the schematic diagram of Fig. 13. In this view, electrical power supply lines are indicated at 98 and 99, as being connected through line switch 100 with circuit lines 101 and 102. Line 101 leads through a series of normally closed push button switches, designated by reference characters $a$, $b$, $c$, $d$, $e$, $f$, $g$ and $h$; there being a switch corresponding to each of the eight cylinders. Also interposed in series in the line 101 is a push button switch K, referred to as the "sight set button," a "ratchet set" switch button P and a push button switch R; the latter being referred to as the "recede button."

Beyond the series of switches as above referred to, the line 101, which has said switches interposed therein in succession, leads to one side of the solenoid valve 86 which controls the admittance of air to the pawl set cylinder 54. The other side of solenoid valve 86 is connected to circuit line 102 by a circuit connection 103.

The eight solenoid valves 89, which individually control the application of operating air to the eight air cylinders, 62, are all connected at one side to the power line 102 through a connecting line 105, and each of these solenoid valves is electrically connected by an individual circuit line 106 with its corresponding cylinder control push button switch, with line 101; these circuit lines 106 normally being open. These push button switches provide, if any one of them is depressed, that the circuit through line 101 to the solenoid valve 86 is thereby opened. This causes the valve, which is normally positioned to admit air under pressure into the air cylinder 54, to exhaust air from the cylinder and allow the pawl to be disengaged from the ratchet wheel by the action of the springs 50. Then, the full depression of the switch closes the circuit through a connecting line 106 to the solenoid valve 89 of the corresponding air cylinder, causing an operation of the valve whereby air under pressure is admitted to the cylinder. This actuates the pistons of the energized cylinder apart, and causes the piston rod of that cylinder to be moved endwise thereby and the cross head 67 and rack 70 to be moved accordingly. The moving rack 70 rotates gear 45 which swings the sweep arm from its starting position resting against the stop 60, to a predetermined arcuate distance away from the stop. Release of the fully depressed switch button then permits it to return to its normal position at which it again closes the circuit through line 101 to solenoid valve 86 and thus energizes the valve 86 to cause it to again admit operating air to the pawl set cylinder 54 and cause the pawl to be locked with the ratchet wheel, and the parts are ready for the outsetting of the log upon energization of the set shaft.

In the present arrangement of parts, the energization of solenoid valve 83 results in the driving of the motor 28 for an outsetting of the knees, on the carriage. Energization of valve 83' results in a reverse driving of the motor for retracting the knees.

Each of the valves 83 and 83' has one side connected to circuit line 102, and the other side of each is connected, respectively through circuit lines 110 and 111, with circuit line 101 through the switches P and R, respectively. The depression of switch R first opens the circuit to valve 86 to disengage the ratchet pawl and then closes the circuit connection from line 101 through line 110 and solenoid 83 to line 102.

Assuming that the construction and arrangement of parts is as above described, operation is as follows:

Preparatory to loading a log on the carriage, the carriage knees are receded. The receding action is accomplished by depressing the recede switch button R, to de-energize valve 86 and effect the disengagement of the ratchet pawl, and then to close the circuit through line 111 to solenoid valve 83' thus causing the valve to adjust itself to admit operating air to the motor 28 to drive it in a reverse direction, for the receding of the knees to the desired extent.

After the log has been properly loaded, it is then set out for removal of the first slab by the depression of the "sight set" switch button K. This causes valve 86 to again operate to disengage the ratchet pawl and then close a circuit through line 110 to valve 83 causing it to adjust itself to admit operating air to the motor 28 to drive it in a forward direction, thus to move the knees forwardly and set out the log to the desired extent. The carriage is then advanced to cause removal of the slab.

During removal of the first slab the operator decides upon the thickness of the next board or cant to be removed, and depresses the pre-set switches a, b, c, d, e, f, g or h whereby the setting for the selected thickness is to be obtained. The depressing of that selected button, first opens the circuit through line 101 to solenoid valve 86 which operates to effect the disengagement of the pawl of the sweep arm from the ratchet wheel, and then closes a circuit through a connecting line 106 to the corresponding solenoid valve 89 to cause the admittance of operating air to the corresponding cylinder 62 and by its action to effect the adjustment of the sweep arm 40 from a position against stop 60 to the predetermined position.

As an example of such a sweep arm setting, refer to Fig. 11 wherein the normal positions of rest of the cross head 67, rack 70 and sweep arm 40 are shown in dotted lines. Upon energization of the top cylinder by depression of the proper push button, the cross head and rack were moved from their dotted line positions to the right, thus to swing the arm 40 from against stop 60 to the upright position at which it is shown in full lines. This is designated as the "starting position" for knee adjustments made by that particular cylinder. Release of the depressed push button switch after the sweep arm has been set operates to close the circuit to solenoid valve 86 and through it cause the locking of the pawl with the ratchet wheel. Then, after the carriage has cleared the saw, the operator presses the ratchet set switch button P which closes the circuit to the air motor solenoid valve 83. But this does not disturb the circuit to valve 86, thereby leaving the ratchet pawl engaged with the ratchet wheel. The valve 83, being energized, admits air to the motor to drive it to turn the set shaft to set out the log to the selected distance as permitted by the swing of the sweep arm before being stopped by engaging stop 60. With this setting operation, and arcuate swinging of arm 40, the gear 45 rotates to restore the cross head 67 and all piston rods to initial position, as designated in dotted lines in Fig. 11.

If the operator has made a resetting adjustment of the sweep arm 40 while a slab is being cut from the log and then should he, before that cut has been finished, decide on a different thickness, for example, to change from a three inch setting of the sweep arm to a two inch setting, he has only to depress the pre-set switch button a, b, c, d, e, f, g, or h corresponding to the two inch setting. This effect disengagement of the pawl and the necessary readjustment of the sweep arm. The outsetting movement of the log, however, does not take place until the air motor is energized. This is effected by the operator after the saw has cleared the log.

All preset operations are made in the same way, each operation first causing the movement of rack 70 to the right, in reference to the showing in Fig. 11, to bring the sweep arm to its "starting position," then to restore the parts to stopped normal position incident to the swing of the arm 40 to position against the stop 60.

What I claim is:

1. In combination; a log carriage equipped with means including a set shaft that is rotatable for effecting the outsetting of a log as disposed on the carriage, to various distances in accordance with the extent of rotation of said set shaft and a set works mechanism mounted on the carriage; said mechanism comprising a drive shaft that has geared connection with the set shaft, a wheel mounted to rotate in accordance with the rotation of said drive shaft, a sweep arm associated with and mounted for rotation coaxially of said wheel, releasable means on the sweep arm adapted to be actuated to lock the sweep arm to said wheel for rotation therewith, a fixed stop against which said sweep arm will engage when locked to and rotating with said wheel to limit the log outsetting rotation of said set shaft, a plurality of selectively operable devices for swinging the sweep arm away from the stop to positions at different angular distances therefrom, means for causing said releasable means to lock said sweep arm to said wheel after the arm has been selectively positioned, and means for driving said drive shaft to effect an outsetting operation of the set shaft to the extent permitted by said sweep arm as locked to said wheel.

2. In combination; a log carriage equipped with means including a set shaft that is rotatable in one direction for effecting the outsetting of a log as disposed on the carriage, to various distances in accordance with the extent of its rotation and a set works mechanism mounted on the carriage; said mechanism comprising a rotatably mounted drive shaft geared to said set shaft, a ratchet wheel fixed on said drive shaft, a sweep arm mounted on said drive shaft for free rotation thereon, a pawl mounted by the sweep arm and adapted to be moved from disengagement into engagement with the ratchet wheel to lock the sweep arm thereto, a fixed stop positioned to be engaged by the sweep arm when locked to and rotating with the ratchet wheel to limit the extent of turning of said set shaft, a plurality of means connected with and selectively operable to effect the setting of the sweep arm at different predetermined arcuate distances from said stop, means operable to effect the locking of the pawl with the ratchet wheel after a setting of the arm has been made and means for energizing said drive shaft to effect rotation thereby of said set shaft for outsetting a log to the extent permitted by the sweep arm, as locked to said ratchet wheel.

3. In combination, a log carriage equipped with means including a set shaft that is rotatable in one direction for effecting the outsetting of a log as disposed on the carriage, to various distances in accordance with the extent of rotation of said set shaft and a set works mechanism mounted on the carriage; said mechanism comprising a rotatably mounted drive shaft having geared connection with said set shaft, a ratchet wheel fixed on said drive shaft, a sweep arm mounted on said drive shaft for free rotation thereon, a pawl mounted on the sweep arm and adapted to be locked with the teeth of said ratchet wheel to cause said sweep arm to turn with said drive shaft in a log outsetting operation, a fixedly mounted stop member positioned for engagement by the sweep arm when locked to and rotating with ther atchet wheel, arm setting means for effecting arcuate swinging adjustments of the sweep arm to different distances away from said stop, a plurality of devices connected with and selectively operable from its starting position, each to effect functioning of said arm setting means for the setting of the sweep arm at a predetermined arcuate distance from said stop, means for effecting the locking of said pawl with the teeth of the ratchet wheel when a setting of the arm has been made, and power means for rotating said drive shaft to effect rotation of the set shaft to the extent permitted by the sweep arm as locked to the ratchet wheel.

4. The combination recited in claim 3 wherein the swinging of the sweep arm as locked to the ratchet wheel effects the return of the last actuated of said plurality of devices to its starting position.

5. The mechanism of claim 3 wherein said arm setting means comprises a pinion gear fixed to the sweep arm coaxially of the axis about which the arm and ratchet wheel are rotatable, and a rack bar that is reciprocally supported in mesh with said pinion gear and wherein each of said plurality of devices has an operative connection with the rack bar.

6. In combination, a log carriage equipped with means including head blocks and knees for the outsetting and retractive movements of a log as disposed on the carriage, a set shaft that is rotatable in one direction for effecting the advance movement of the knees for the outsetting of a log as disposed on the carriage, to various distances in accordance with the extent of rotation of said set shaft and rotatable in the opposite direction to retract the knees toward starting position, a set works mechanism mounted on said carriage; said set works comprising a rotatably mounted drive shaft having geared driving connection with said set shaft, a ratchet wheel fixed on said drive shaft, a sweep arm mounted adjacent the ratchet wheel for rotation on the drive shaft, a pawl mounted on the sweep arm and adapted to be moved into locked engagement with said ratchet wheel at any point circumferentially thereof for rotation of said arm with the ratchet when said shaft is turning in the outsetting direction, yieldable means acting against the pawl to urge it to a position disengaged from the ratchet wheel, a fixed stop positioned for engagement by the sweep arm when locked to and rotating with the ratchet wheel to limit the outsetting distance, a pinion gear fixed to said sweep arm coaxial of the axis about which it is rotatable, a reciprocally mounted rack bar meshing with said pinion gear, a plurality of pressure medium cylinders, each having its piston rod operatively connected with said rack bar, and operable upon application of pressure medium to its cylinder to move it for setting the sweep arm at one of a plurality of different predetermined arcuate distances from said stop, means for actuating the pawl into and for holding it in arm locking contact with the ratchet wheel after a setting of the sweep arm has been made by a cylinder, and reversible power means for driving said drive shaft through an arc determined by the setting of said sweep arm to effect rotation of said set shaft for the log outsetting operation and in the opposite direction for retraction of the head block and knees and for retraction of said piston rods into said cylinders.

7. The combination recited in claim 6 including a source of supply of pressure medium, and means, selectively operable, to apply pressure medium to the individual cylinders to effect their particular arm setting operations.

8. The apparatus of claim 6 wherein each of said pressure medium cylinders is fixedly mounted and each has a piston therein operable through the mediacy of its piston rod to actuate the rack bar, and wherein the piston rod of each is restored to its starting position through the mediacy of the rack bar incident to that movement thereof that is caused by rotation of the pinion gear under the driving influence of the sweep arm in its rotation with the pinion gear.

9. An apparatus as recited in claim 6 wherein said means for actuating said wall into arm locking position comprises a pressure medium cylinder carried by the sweep arm, a piston contained in said cylinder, means operatively connecting the piston and pawl for the actuation of the latter, and means for controlling the application of pressure medium to the cylinder.

10. The apparatus of claim 6 including a source of supply of pressure medium and means selectively operable to apply pressure medium from said source of supply to the individual cylinders, and wherein each cylinder is equipped with two pistons that are slidable on the piston rod between abutments that are spaced on the rod a distance equal to the opposite internal limits of the cylinder, and wherein the place of application of pressure medium to each cylinder is so located that when the medium is admitted to a cylinder it will act on both its pistons to effect a relative movement thereof away from each other and to positions against said opposite limits of the cylinder thus to shift the piston rod for an arm setting operation.

11. The apparatus of claim 9 wherein said rack bar has fixed connection with a reciprocally movable cross head, and wherein all cylinders are parallel and coextensive, and the rod of each is fixed at one end to said cross head, and the rod lengths, as measured between cross head and nearest abutment are progressively increased to provide the different settings of the sweep arm.

12. In combination, a log carriage equipped with means including log setting knees and a set shaft that is rotatable in opposing directions for the receding and advancing of said knees in accordance with the direction and extent of rotation of said shaft, and a set works mechanism mounted on the carriage; said set works mechanism comprising a rotatably mounted drive shaft positively geared to said set shaft, a ratchet wheel fixed on the drive shaft, a sweep arm mounted for free swinging movement about the drive shaft, a pawl movably mounted on the sweep arm, an air cylinder in the arm for actuating said pawl from disengagement into locking engagement with said ratchet wheel for the positive rotating said arm therewith in outsetting direction, spring means acting against the pawl for disengaging it when said air cylinder is de-energized, a stop fixed on the carriage in position for engagement by the sweep arm when locked to and rotating with the ratchet wheel to limit advancing movement of said knees, a plurality of arm setting air cylinders connected with and selectively operable to effect the setting of said sweep arm at different arcuate distances away from said stop, a source of air under pressure, a solenoid valve for controlling the application of air from said source to each of said cylinders, a reversible motor for driving said drive shaft in outsetting direction through an arc determined by the setting of the sweep arm to advance the knees and in the opposite direction to recede said knees, a solenoid valve for controlling application of air from said source to the pawl actuating air cylinder, and an electrical system for controlling the action of said solenoid valves.

13. The combination recited in claim 12 wherein said electrical control system includes a circuit for the solenoid valve which controls the pawl actuating air cylinder, and individual circuits and control switches therein for the solenoid valves which control application of air to the arm setting air cylinders.

14. The combination recited in claim 13 wherein the last mentioned control switches are in series connection and form a part of the circuit for the solenoid valve which controls the pawl actuating air cylinder.

15. The combination recited in claim 13 wherein the last mentioned control switches are of double throw type and have the contacts at one side thereof joined in series and as thus joined serve as a part of the circuit for the solenoid valve that controls the pawl actuating air cylinder, and wherein the contacts at the other side are connected respectively in the circuits of the solenoid valves which individually control the corresponding arm setting cylinders.

16. The combination recited in claim 15 wherein said reversible motor is air driven, and solenoid valves are selectively operable for application of air thereto for driving the motor to effect the receding or advancing the knees; and wherein said electrical system includes separate circuits for said last mentioned solenoid valves.

References Cited in the file of this patent

UNITED STATES PATENTS

| | | |
|---|---|---|
| 679,037 | Scherer | July 23, 1901 |
| 817,888 | Trout | Apr. 17, 1906 |
| 1,561,341 | Martin | Nov. 10, 1925 |
| 1,561,342 | Martin | Nov. 10, 1925 |
| 2,661,036 | Balch et al. | Dec. 1, 1953 |
| 2,707,501 | Craik | May 3, 1955 |
| 2,714,906 | Peterson | Aug. 9, 1955 |